United States Patent
Youn

(10) Patent No.: US 11,897,206 B2
(45) Date of Patent: Feb. 13, 2024

(54) METHOD FOR ATTACHING EMBLEM TO VEHICLE SEAT

(71) Applicant: Shinpoong H Co., Ltd., Seoul (KR)

(72) Inventor: Ta Chell Youn, Seoul (KR)

(73) Assignee: SHINPOONG H CO., LTD., Seoul (KR)

( * ) Notice: Subject to any disclaimer, the term of this patent is extended or adjusted under 35 U.S.C. 154(b) by 0 days.

(21) Appl. No.: 17/796,668

(22) PCT Filed: Jan. 28, 2021

(86) PCT No.: PCT/KR2021/001119
§ 371 (c)(1),
(2) Date: Jul. 31, 2022

(87) PCT Pub. No.: WO2021/153999
PCT Pub. Date: Aug. 5, 2021

(65) Prior Publication Data
US 2023/0057013 A1    Feb. 23, 2023

(30) Foreign Application Priority Data

Jan. 30, 2020 (KR) .................. 20-2020-0000382
Aug. 24, 2020 (KR) .................. 10-2020-0106483

(51) Int. Cl.
*B29C 65/04* (2006.01)
*B29C 65/48* (2006.01)
(Continued)

(52) U.S. Cl.
CPC .............. *B29C 65/04* (2013.01); *B29C 65/48* (2013.01); *B29C 66/028* (2013.01);
(Continued)

(58) Field of Classification Search
CPC ....... B29C 65/04; B29C 65/48; B29C 66/028; B29K 2627/06; B29K 2675/00; B29K 2031/58; B60N 2/5875; B60R 13/005
See application file for complete search history.

(56) References Cited

U.S. PATENT DOCUMENTS

| 4,157,272 A | * | 6/1979 | Kuroda | ................. B29C 67/20 156/251 |
| 4,793,033 A | * | 12/1988 | Schneider | .............. D06C 23/02 83/100 |
| 8,171,975 B2 | * | 5/2012 | Suzuki | ................ B29C 66/1122 269/48 |

FOREIGN PATENT DOCUMENTS

| JP | S64-44730 A | 2/1989 |
| JP | 2017-030237 A | 2/2017 |

(Continued)

OTHER PUBLICATIONS

English machine translation of JP 01-044730 A; 1989; 6 page; equivalent to JPS 64-44730—1989. (Year: 1989).*

(Continued)

*Primary Examiner* — Linda L Gray
(74) *Attorney, Agent, or Firm* — Bridgeway IP Law Group, PLLC; Sang Ho Lee; Hyun Woo Shin

(57) ABSTRACT

According to one aspect of the present invention, provided is a method of attaching an emblem to a vehicle seat, the method including providing a seat and an emblem, the seat having an outer surface on which a coating layer is formed, removing the coating layer to correspond to an edge of the emblem, aligning the emblem with the seat to correspond to a portion in which the coating layer is removed, and attaching the emblem to the seat by pressing the emblem using a mold unit and applying a high-frequency current.

7 Claims, 4 Drawing Sheets

(51) Int. Cl.
    *B29C 65/00*         (2006.01)
    *B29K 627/06*      (2006.01)
    *B29K 675/00*      (2006.01)
    *B29L 31/58*       (2006.01)
    *B60N 2/58*        (2006.01)
    *B60R 13/00*       (2006.01)

(52) U.S. Cl.
    CPC ...... *B29K 2627/06* (2013.01); *B29K 2675/00* (2013.01); *B29L 2031/58* (2013.01); *B60N 2/5875* (2013.01); *B60R 13/005* (2013.01)

(56) References Cited

FOREIGN PATENT DOCUMENTS

| | | | | |
|---|---|---|---|---|
| JP | 2018-158583 A | 10/2018 | | |
| KR | 20-2020-0000879 U | 1/2000 | | |
| KR | 10-2015-0014381 A | 2/2015 | | |
| SE | 518311 | * | 9/2002 | ............ G09F 19/22 |
| WO | 2011/151904 A1 | 12/2011 | | |

OTHER PUBLICATIONS

English machine translation of SE 518311 C2; Sep. 24, 2002; 7 pages. (Year: 2002).*

* cited by examiner (a)

(b)

(c)

METHOD FOR ATTACHING EMBLEM TO VEHICLE SEAT

TECHNICAL FIELD

The present invention relates to a method of attaching an emblem to a vehicle seat.

BACKGROUND ART

Vehicle seats require various functions such as safety, durability, and ease of getting on and off, and there are also many demands for the vehicle seats to provide comfort to riders, such as seat comfort, breathability, and vibration-absorbing performance. Such vehicle seats are main parts among interior parts of vehicles, and there are various demands for their appearance and design.

Such vehicle seats may be manufactured with various designs according to the atmosphere or interior of a vehicle, and in the case of a luxury vehicle, there are cases in which an emblem expressing a name of a vehicle manufacturer or model name is engraved in the vehicle seat.

In this case, an emblem generally is a badge, and when the emblem is used in a vehicle, denotes a mark designed from the name of the manufacturer or model name of the vehicle.

Most manufacturers attach emblems to radiator grills or trunk leads as their symbols, and emblems are also attached to handles and internal parts of vehicles to not only improve the design value of the vehicles but also express the pride of the vehicles.

RELATED ART

Patent Document

Korean Open Utility Model Publication No. 20-1998-0010470 (Jan. 15, 2000)

Disclosure

Technical Problem

The present invention is directed to providing a method of attaching an emblem to a vehicle seat by removing a coating layer formed on a seat to correspond to a shape of an emblem, aligning the emblem with a region in which the coating layer on the seat is removed, and attaching the emblem using a high-frequency fusion method.

Technical Solution

One aspect of the present invention provides a method of attaching an emblem to a vehicle seat, the method including providing a seat and an emblem, the seat having an outer surface on which a coating layer is formed, removing the coating layer to correspond to an edge of the emblem, aligning the emblem with the seat to correspond to a portion in which the coating layer is removed, and attaching the emblem to the seat by pressing the emblem using a mold unit and applying a high-frequency current.

The method of attaching an emblem to a vehicle seat may further include temporarily attaching the emblem to the seat using the mold unit after the aligning of the emblem with the seat.

The aligning of the emblem with the seat may include attaching the emblem to an adhesive sheet and attaching the adhesive sheet to which the emblem is attached to the seat to correspond to the portion in which the coating layer is removed.

The method of attaching an emblem to a vehicle seat may further include removing the adhesive sheet after the temporary attaching of the emblem to the seat.

In the temporary attaching of the emblem to the seat and the attaching of the emblem to the seat, the mold unit may press the emblem and apply a high-frequency current to temporarily attach and attach the emblem to the seat.

The mold unit may be formed in a shape corresponding to the edge of the emblem.

The mold unit may include a first jig which aligns the seat according to a position at which the emblem is attached and a second jig which corresponds to the first jig and presses the seat.

The mold unit may further include a protrusion coupled to the second jig and formed in a shape corresponding to the edge of the emblem.

The removing of the coating layer may be performed by irradiating the seat with a laser.

The emblem and the seat may be formed of different materials.

Advantageous Effects

According to embodiments, an emblem can be attached by removing a coating layer formed on a seat to correspond to a shape of the emblem, aligning the emblem with a region in which the coating layer on the seat is removed, and using a high-frequency fusion method.

REFERENCE NUMERALS

Figure 1:
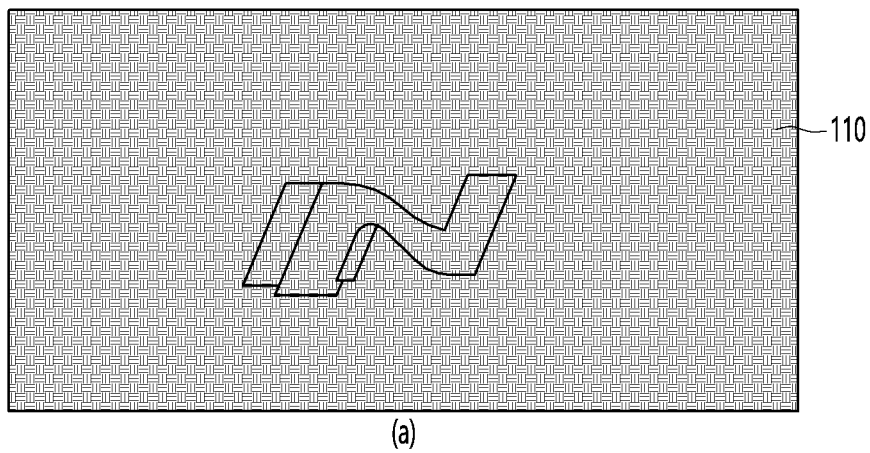
FIG. 1 is a set of views illustrating a method of attaching an emblem to a vehicle seat according to one embodiment of the present invention.
Figure 1:
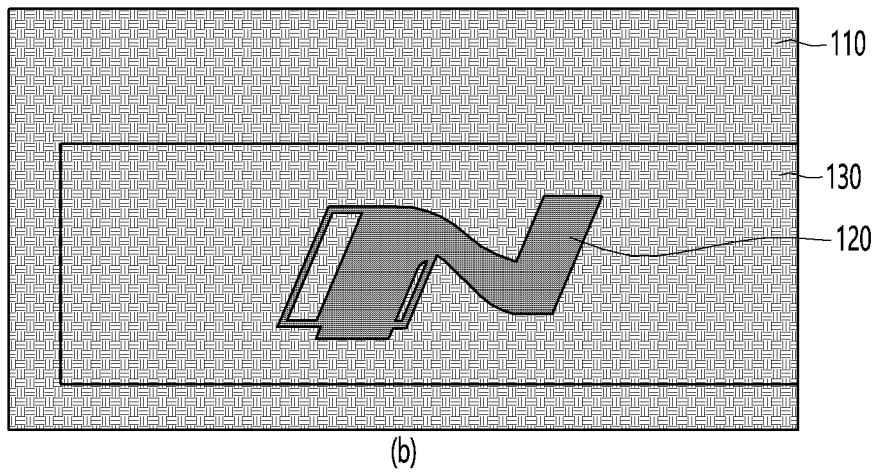
Figure 1:
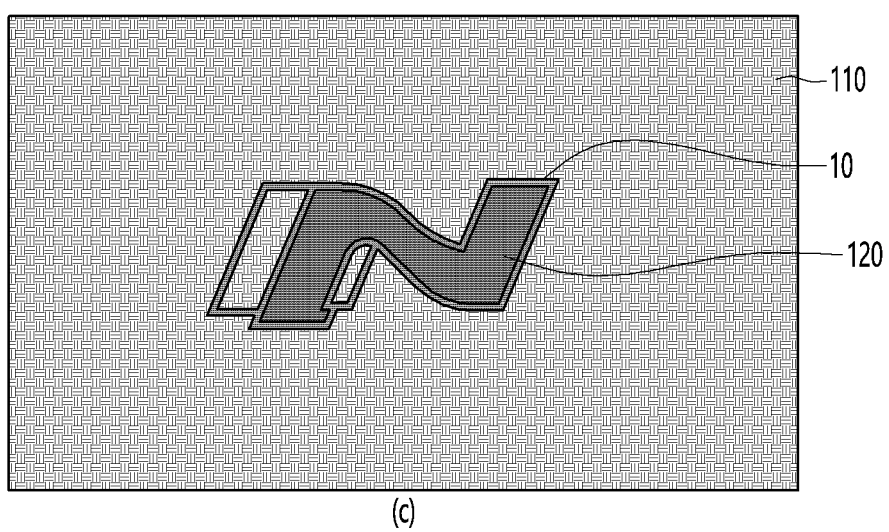

10: ATTACHMENT REGION
110: SEAT
112: COATING LAYER
120: EMBLEM
130: ADHESIVE SHEET
140: MOLD UNIT
142: FIRST JIG
144: SECOND JIG
146: PROTRUSION
148: SUPPORT

MODES OF THE INVENTION

Since the present invention allows for various changes and numerous embodiments, specific embodiments will be illustrated in the accompanying drawings and described in the detailed description. However, this is not intended to limit the present invention to the specific embodiments, and it is to be appreciated that all changes, equivalents, and substitutes falling within the range of the spirit and technical scope of the present invention are encompassed in the present invention. In the description of the embodiments, certain detailed descriptions of the related art are omitted when it is deemed that they may unnecessarily obscure the gist of the inventive concept.

While terms such as "first" and "second" may be used to describe various components, such components are not limited by the above terms. The above terms are used only to distinguish one component from another.

The terminology used herein is for the purpose of describing particular embodiments only and is not intended to limit the present invention. The singular forms are intended to include the plural forms, unless the context clearly indicates otherwise. In the present specification, it should be understood that the terms "comprise," "comprising," "include," and/or "including," when used herein, specify the presence of stated features, numbers, steps, operations, elements, components, and/or combinations thereof but do not preclude the presence or addition of one or more other features, numbers, steps, operations, elements, components, and/or combinations thereof.

In addition, in a contact relationship between components, the term "couple" is used to express an inclusive concept including not only a case in which the components are directly physically in contact with each other but also a case in which other components are interposed between and in contact with the components.

Hereinafter, embodiments of a method of attaching an emblem to a vehicle seat according to the present invention will be described in detail with reference to the accompanying drawings, and in the description with reference to the accompanying drawings, components that are the same or correspond to each other will be denoted by the same reference numerals, and redundant description will be omitted.

According to the present embodiment, a method of attaching an emblem to a vehicle seat includes providing a seat 110 and an emblem 120, the seat 110 having an outer surface on which a coating layer 112 is formed, removing the coating layer 112 to correspond to an edge of the emblem 120, aligning the emblem 120 with the seat 110 to correspond to a portion in which the coating layer 112 is removed, and attaching the emblem 120 to the seat 110 by pressing the emblem 120 using a mold unit 140 and applying a high-frequency current.

Generally, a vehicle seat may be damaged due to causes such as contamination, moisture, friction, and sunlight, and in order to prevent such damage, the coating layer 112 may be formed on an outer portion of the vehicle seat. The coating layer 112 formed on the vehicle seat protects the vehicle seat but increases the difficulty of a process of attaching the emblem 120 to the vehicle sheet at the same time.

In the method of attaching an emblem to a vehicle seat of the present embodiment, in order to attach the emblem 120 to the seat 110 to which it is difficult to attach the emblem 120 because the coating layer 112 is formed, the coating layer 112 formed on the seat 110 may be removed to correspond to a shape of the emblem 120, and the emblem 120 may be aligned with and attached to a region in which the coating layer 112 of the seat 110 is removed using a high-frequency fusion method.

Accordingly, the present invention has a feature in a process of aligning the emblem 120 with the seat 110 from which the coating layer 112 is removed to correspond to the shape of the emblem 120 and attaching the emblem 120 to the seat 110 in the aligned state.

Hereinafter, operations of the method of attaching an emblem to a vehicle seat will be more specifically described with reference to FIGS. 1 to 4.

Figure 2:
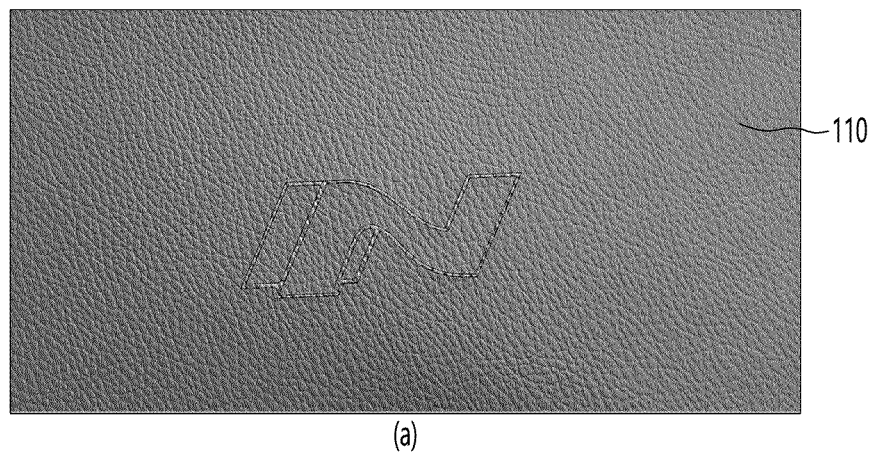
FIG. 2 is a set of images showing the method of attaching an emblem to a vehicle seat according to one embodiment of the present invention.
Figure 2:
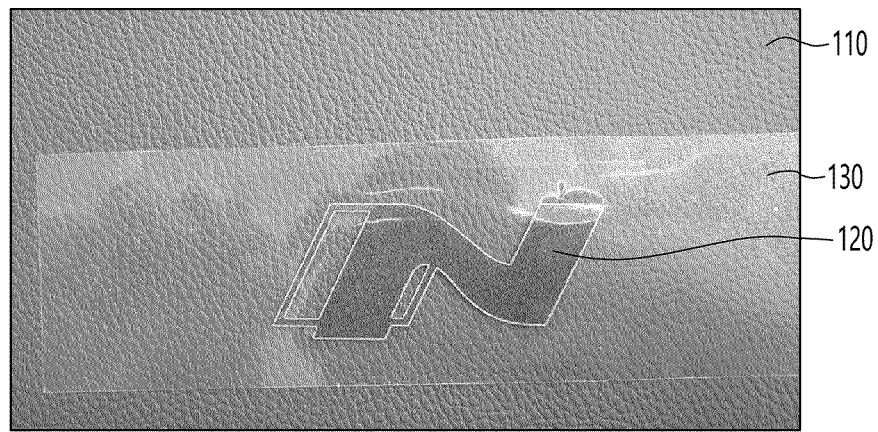
Figure 2:
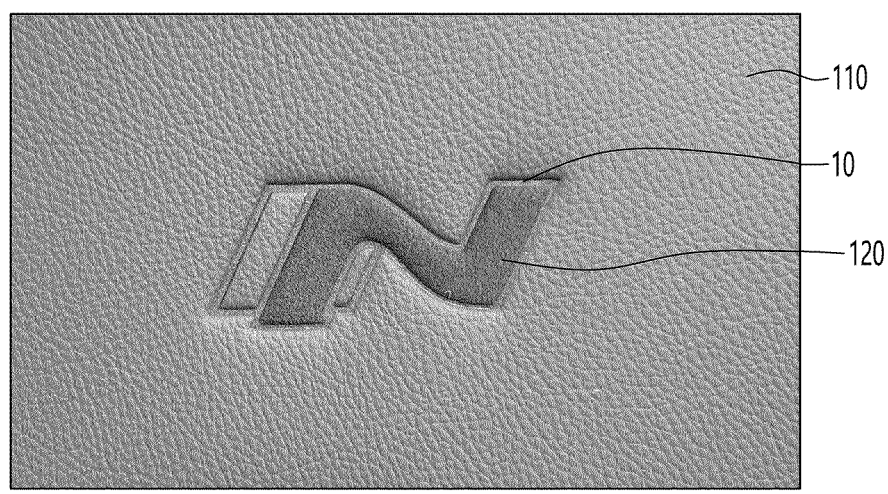
Figure 3:
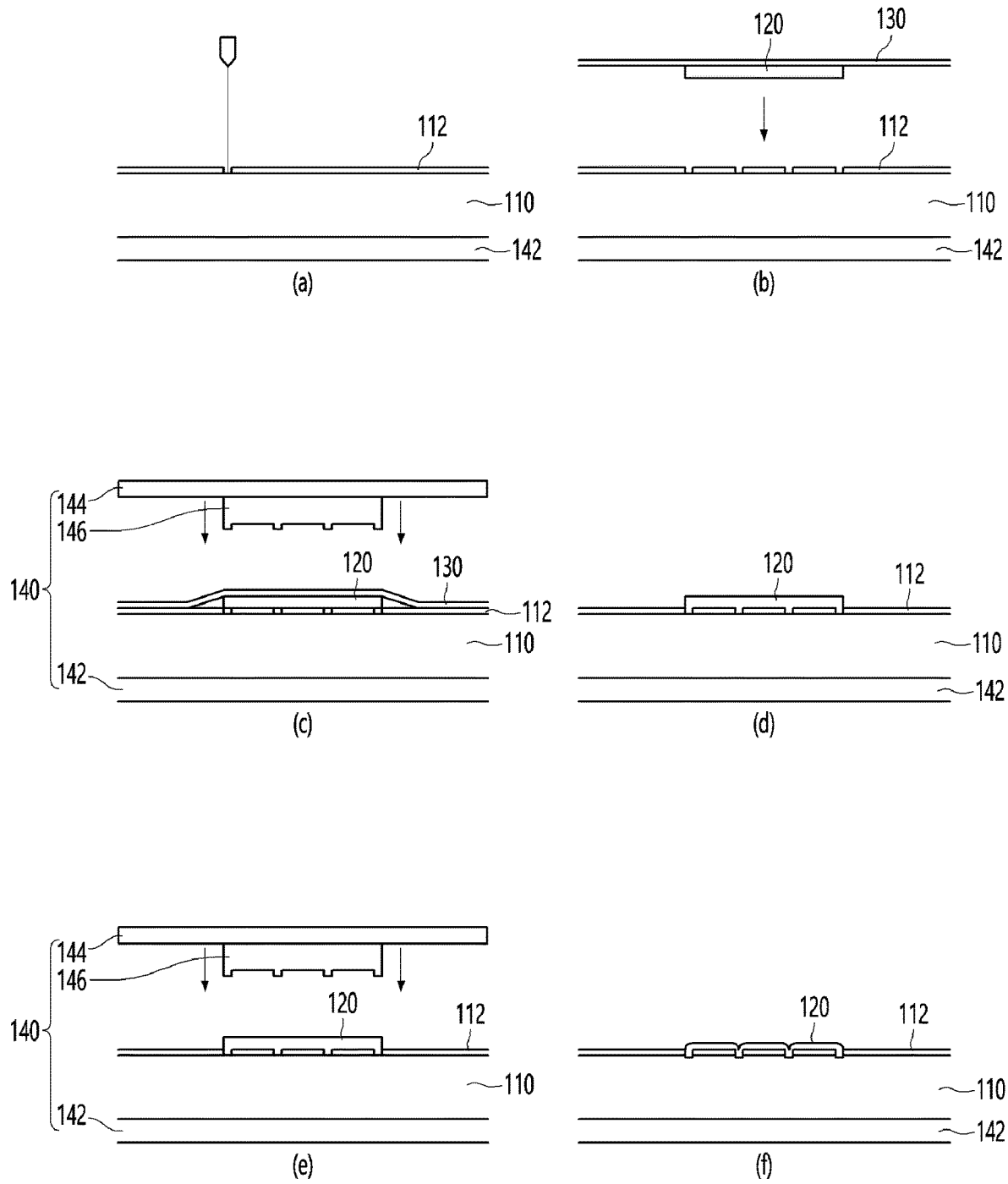
FIG. 3 is a set of process views illustrating the method of attaching an emblem to a vehicle seat according to one embodiment of the present invention.

First, as illustrated in FIGS. 1 to 3, the providing of the seat 110 having the outer surface on which the coating layer 112 is formed and the emblem 120 may be performed.

In this case, the seat 110 may be formed of artificial leather including at least one of polyurethane (PU) and polyvinyl chloride (PVC) or natural leather.

Then, as illustrated in FIG. 3A, the removing of the coating layer 112 to correspond to the edge of the emblem 120 may be performed, and the removing of the coating layer 112 may be performed by irradiating the seat 110 with a laser.

Then, as illustrated in FIG. 3B, the aligning of the emblem 120 with the seat 110 to correspond to the portion in which the coating layer 112 is removed may be performed.

More specifically, as illustrated in FIGS. 1 and 2, the aligning of the emblem 120 with the seat 110 may include attaching the emblem 120 to an adhesive sheet 130 and attaching the adhesive sheet 130, to which the emblem 120 is attached to correspond to the portion in which the coating layer 112 is removed, to the seat 110, and through such operations, the emblem 120 may be aligned with the portion of the seat 110 from which the coating layer 112 is removed.

Then, after the attaching of the emblem 120 to the seat 110, temporarily attaching the emblem 120 to the seat 110 may be performed using the mold unit 140. In this operation, a position of the emblem 120 may be primarily fixed in a state in which the emblem 120 is aligned with the portion in which the coating layer 112 is removed. In this case, the temporary attaching of the emblem 120 to the seat 110 using the mold unit 140 may be performed by pressing the emblem 120 and applying the high-frequency current, and may be performed using a smaller strength than the above-described attaching of the emblem 120 using the mold unit 140.

Then, after the temporary attaching of the emblem 120 to the seat 110, the removing of the adhesive sheet 130 may be performed.

Then, the attaching of the emblem 120 to the seat 110 may be performed by pressing the emblem 120 using the mold unit 140 and applying the high-frequency current. In this case, a method of the attaching of the emblem 120 to the seat 110 by pressing the emblem 120 using the mold unit 140 and applying the high-frequency current is a high-frequency fusion method, and generally, the high-frequency fusion method is mainly used to bond PVC and PU products, and products manufactured using the high-frequency fusion method include stationery, toys, tents, shoes, medical products, and the like.

Next, the mold unit 140 used in the temporary attaching and the attaching of the emblem 120 to the seat 110 will be specifically described.

Figure 4:
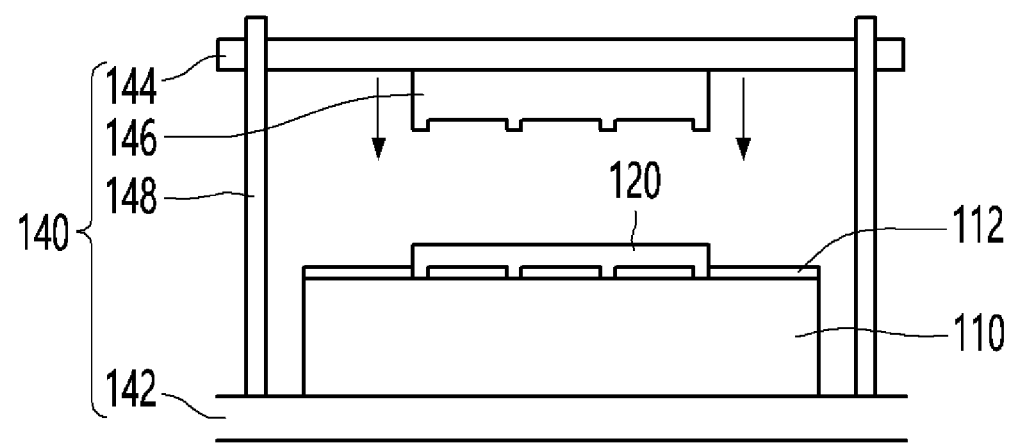
FIG. 4 is a view illustrating a structure of a mold unit used in the method of attaching an emblem to a vehicle seat according to one embodiment of the present invention.

As illustrated in FIGS. 3 and 4, the mold unit 140 may be formed in a shape corresponding to the edge of the emblem 120. Accordingly, the emblem 120 may be attached to the seat 110 by high-frequency-fusing the emblem 120 and the seat 110 along the edge of the emblem 120.

More specifically, the mold unit 140 may include a first jig 142 which aligns the seat 110 according to the position at which the emblem 120 is attached and a second jig 144 which corresponds to the first jig 142 and presses the seat 110, the first jig 142 may align the seat 110 from under the seat 110, and the second jig 144 may be positioned above the seat 110 to correspond to the first jig 142 and press the seat 110.

In addition, the mold unit 140 may further include a protrusion 146 coupled to the second jig 144 and formed in a shape corresponding to the edge of the emblem 120. In this case, a high-frequency current may be applied to the protrusion 146 to attach the emblem 120 and the seat 110, and an attachment region 10 may be formed according to the shape of the protrusion 146.

In addition, in the attaching of the emblem 120 to the seat 110, the mold unit 140 may press the edge of the emblem 120 and apply the high-frequency current to form an embossing shape. As described above, in the mold unit 140, the protrusion 146 may be formed to press the edge of the emblem 120, and accordingly, a portion of the edge of the emblem 120 may be fused in a compressed state so that the embossing shape is formed.

In the present embodiment, the emblem 120 and the seat 110 may be formed of different materials, and accordingly, the emblem 120 may be visually highlighted, and the emblem 120 and the seat 110 formed of the different materials may be more stably attached using the high-frequency fusion method.

Meanwhile, as illustrated in FIG. 4, the position of the emblem 120 may be aligned with the seat 110, and the emblem 120 may also be attached to a position of the seat 110 using a support 148 coupled to the first jig 142 and the second jig 144 of the mold unit 140.

In this case, the support 148 may align a position of the first jig 142 with a position of the second jig 144 and align the position of the seat 110 with the position of the emblem 120 at the same time to position the emblem 120 at the portion in which the coating layer 112 of the seat 110 is removed. In addition, the emblem 120 may be attached to the seat 110 using the mold unit 140.

While embodiments of the present invention have been described above, the present invention may be variously modified and changed by those skilled in the art by adding, changing, and removing components without departing from the range of the spirit of the present invention defined by the claims, and will fall within the scope of the present invention.

The invention claimed is:

1. A method of attaching an emblem to a vehicle seat, the method comprising:
providing a vehicle seat and an emblem, the seat having an outer surface on which a coating layer is formed;
removing the coating layer to correspond to an edge of the emblem;
aligning the emblem with the seat to correspond to a portion in which the coating layer is removed by attaching the emblem to an adhesive sheet, and attaching the adhesive sheet' to which the emblem is attached' to the seat to correspond to the portion in which the coating layer is removed;
temporarily attaching the emblem to the seat using a mold;
removing the adhesive sheet after the temporarily attaching of the emblem to the seat; and
attaching the emblem to the seat by pressing the emblem using the mold and applying a high-frequency current.

2. The method of claim 1, wherein, in the temporarily attaching of the emblem to the seat, the mold presses the emblem and applies a second high-frequency current.

3. The method of claim 2, wherein the mold is formed in a shape corresponding to the edge of the emblem.

4. The method of claim 3, wherein the mold comprises:
a first jig which aligns the seat according to a position at which the emblem is attached to the seat;
a second jig which corresponds to the first jig and presses the seat.

5. The method of claim 4, wherein the mold further comprises a protrusion coupled to the second jig and formed in a shape corresponding to the edge of the emblem.

6. The method of claim 1, wherein the removing of the coating layer is performed by irradiating the seat with a laser.

7. The method of claim 1, wherein the emblem and the seat are formed of different materials.

* * * * *